United States Patent
Lorentz (10) Patent No.: US 6,496,767 B1
(45) Date of Patent: Dec. 17, 2002

(54) CONSTANT GROUNDSPEED AUTOSHIFT METHOD AND APPARATUS FOR MAXIMIZING FUEL ECONOMY

(75) Inventor: Timothy Alan Lorentz, Morton, IL (US)

(73) Assignee: Caterpillar Inc, Peoria, IL (US)

(*) Notice: Subject to any disclaimer, the term of this patent is extended or adjusted under 35 U.S.C. 154(b) by 0 days.

(21) Appl. No.: 09/923,391

(22) Filed: Aug. 8, 2001

(51) Int. Cl.[7] .................... G06F 7/00; G06F 17/00; G06F 19/00

(52) U.S. Cl. ................ 701/55; 701/1; 701/51; 701/56; 180/165; 180/305; 180/308; 180/63.3; 180/68.5; 180/54.1; 475/120; 475/291; 475/129; 475/135; 123/443; 123/692; 74/424; 74/417; 60/418; 60/420

(58) Field of Search ............. 701/1, 51, 55, 701/114, 56; 74/424, 417; 475/120, 291, 129, 135; 180/165, 305, 308, 54.1, 65.3, 68.5; 60/418, 420, 285; 123/443, 692, 435; 472/169, 32

(56) References Cited

U.S. PATENT DOCUMENTS

| | | | |
|---|---|---|---|
| 4,088,044 A | * 5/1978 | Taintor | 475/120 |
| 4,387,783 A | * 6/1983 | Carman | 180/165 |
| 4,414,863 A | 11/1983 | Heino | 74/424 |
| 4,441,573 A | * 4/1984 | Carman et al. | 180/165 |
| 4,551,802 A | 11/1985 | Smyth | 701/51 |
| 4,561,055 A | 12/1985 | McKee | 701/51 |
| 4,576,065 A | 3/1986 | Speranza et al. | 74/424 |
| 4,580,465 A | 4/1986 | Omitsu | 74/424 |
| 4,594,666 A | 6/1986 | Cornell | 701/51 |
| 4,625,590 A | 12/1986 | Muller | 74/424 |
| 4,648,040 A | 3/1987 | Cornell et al. | 701/51 |
| 4,663,713 A | 5/1987 | Cornell et al. | 701/51 |
| 4,663,714 A | 5/1987 | Cornell et al. | 701/51 |
| 4,698,763 A | 10/1987 | Smith | 701/51 |
| 4,732,055 A | 3/1988 | Tateno et al. | 74/424 |
| 4,845,621 A | 7/1989 | Kawata et al. | 701/51 |
| 4,852,006 A | 7/1989 | Speranza et al. | 74/866 |
| 4,947,331 A | 8/1990 | Speranza et al. | 701/51 |
| 5,047,934 A | 9/1991 | Saito | 701/51 |
| 5,050,079 A | 9/1991 | Steby | 701/51 |
| 5,089,962 A | 2/1992 | Steby | 701/51 |
| 5,226,351 A | 7/1993 | Matsuoka et al. | 74/424 |
| 5,315,514 A | 5/1994 | Stebby | 701/51 |
| 5,390,117 A | 2/1995 | Graf et al. | 701/51 |
| 5,393,277 A | 2/1995 | White et al. | 477/108 |
| 5,459,658 A | 10/1995 | Morey et al. | 701/51 |
| 5,510,982 A | 4/1996 | Ohnishi et al. | 701/51 |
| 5,611,245 A | 3/1997 | McKee | 74/336 R |
| 5,766,111 A | 6/1998 | Steeby et al. | 477/124 |
| 5,778,329 A | 7/1998 | Officer et al. | 701/55 |
| 5,845,224 A | 12/1998 | McKee | 701/51 |
| 6,042,502 A | 3/2000 | Cronin et al. | 477/68 |
| 6,119,054 A | 9/2000 | Miki et al. | 700/275 |
| 6,223,111 B1 | 4/2001 | Cronin et al. | 701/51 |
| 6,226,584 B1 | 5/2001 | Carlson | 701/51 |
| 2002/0023619 A1 * | 2/2002 | Janak et al. | 123/321 |
| 2002/0032891 A1 * | 3/2002 | Yada et al. | 714/766 |
| 2002/0038777 A1 * | 4/2002 | Cody et al. | 208/87 |

* cited by examiner

Primary Examiner—William A. Cuchlinski, Jr.
Assistant Examiner—Ronnie Mancho (57) ABSTRACT

A method of determining shift points in a step gear transmission system to maximize fuel economy is disclosed. In operation, the method uses fuel economy data from a first gear ratio to determine a first series of constant fuel consumption curves for the first gear ratio. The method then uses fuel economy data from a second gear ratio to determine a second series of constant fuel consumption curves for the second gear ratio. Next, the method determines points of intersection where a respective fuel consumption curve for the first gear ratio intersects its corresponding fuel consumption curve for the second gear ratio. A decision curve is generated from the points of intersection.

27 Claims, 7 Drawing Sheets

CONSTANT GROUNDSPEED AUTOSHIFT METHOD AND APPARATUS FOR MAXIMIZING FUEL ECONOMY

TECHNICAL FIELD

The invention relates to the field of transmissions, and more specifically, a system for and method of shifting a transmission to maximize fuel economy.

BACKGROUND

Transmissions control gear ratio changes in accordance with a shift map. Transmission designs may incorporate an automatic shifting mode known as "Constant Groundspeed Autoshift" (CGA mode), which will automatically shift the transmission to maintain a desired groundspeed. An examination of a transmission system operating in CGA mode reveals that, for any given groundspeed command, the transmission gear ratio requirement is not unique. In other words, any one of several different combinations of engine speed and transmission gear ratio will produce the desired groundspeed. Because of this inherent flexibility, a transmission system can be designed to select the appropriate engine speed and transmission gear ratio based on a selected criterion. It would be useful to select the preferred gear ratio based on maximizing fuel economy, while maintaining an operator's selected groundspeed.

A transmission which attempts to maximize fuel economy in a continuously variable transmission is disclosed in U.S. Pat. No. 4,594,666, "Transmission Monitor/Control Microprocessor for Continuously Variable Power Train". This patent describes a method for controlling a variable ratio power train to automatically adjust the drive reduction ratio so that engine power at all levels is produced at a minimum brake-specific fuel consumption (BSFC). However, the patent only discloses use of such a system with a continuously variable transmission, not with a standard step gear system. The disclosed embodiment of the invention is for a CVT system having operator adjusted HI, MID, and LO range settings, settings which the operator must adjust or the invention cannot maintain adequate power. In addition, the invention does not teach allowing the operator to set a desired groundspeed while maintaining a minimum fuel use; rather, the invention teaches the operator setting a desired power level that the system attempts to maintain, regardless of groundspeed.

The present invention is directed to overcoming one or more problems or disadvantages associated with the prior art.

SUMMARY OF THE INVENTION

In accordance with an aspect of the present invention, a method of determining shift points in a step gear transmission system to maximize fuel economy is disclosed. In operation, the method uses fuel economy data from a first gear ratio to determine a first series of constant fuel consumption curves for the first gear ratio. The method then uses fuel economy data from a second gear ratio to determine a second series of constant fuel consumption curves for the second gear ratio. Next, the method determines points of intersection where a respective fuel consumption curve for the first gear ratio intersects its corresponding fuel consumption curve for the second gear ratio. A decision curve is generated from the points of intersection.

In accordance with another aspect of the present invention, a machine-readable storage medium having stored thereon machine executable instructions is disclosed. The execution of the instructions is adapted to implement a method for determining shift points in a step gear transmission system to maximize fuel economy. In operation, the method uses fuel economy data from a first gear ratio to determine a first series of constant fuel consumption curves for the first gear ratio. The method then uses fuel economy data from a second gear ratio to determine a second series of constant fuel consumption curves for the second gear ratio. Next, the method determines points of intersection where a respective fuel consumption curve for the first gear ratio intersects its corresponding fuel consumption curve for the second gear ratio. A decision curve is generated from the points of intersection.

In accordance with another aspect of the present invention, a system for determining shift points in a step gear transmission system to maximize fuel economy is disclosed. The system includes a controller and memory coupled to the controller. The controller is operable to use fuel economy data from a first gear ratio to determine a first series of constant fuel consumption curves for the first gear ratio. The controller then uses fuel economy data from a second gear ratio to determine a second series of constant fuel consumption curves for the second gear ratio. Next, the controller determines points of intersection where a respective fuel consumption curve for the first gear ratio intersects its corresponding fuel consumption curve for the second gear ratio. A decision curve is generated from the points of intersection.

In accordance with another aspect of the present invention, a method of controlling a step gear transmission to maximize fuel economy is disclosed. The method receives data regarding the operating point of the engine. The operating point is compared to a stored decision curve, wherein the decision curve divides a range of operating points between a first adjacent gear ratio and a second adjacent gear ratio based on the most fuel efficient gear ratio for operation. The method includes shifting the transmission between the first adjacent gear ratio and the second adjacent gear ratio based on the comparison of the operating point to the decision curve.

In accordance with another aspect of the present invention, a system for controlling a step gear transmission to maximize fuel economy is disclosed. The system includes a controller and memory coupled to the controller. The controller receives data regarding the operating point of the engine. The operating point is compared to a stored decision curve, wherein the decision curve divides a range of operating points between a first adjacent gear ratio and a second adjacent gear ratio based on the most fuel efficient gear ratio for operation. The method includes shifting the transmission between the first adjacent gear ratio and the second adjacent gear ratio based on the comparison of the operating point to the decision curve.

The foregoing summarizes only a few aspects of the invention and is not intended to be reflective of the full scope of the invention as claimed. Additional features and advantages of the invention are set. forth in the following description, may be apparent from the description, or may be learned by practicing the invention. Moreover, both the foregoing summary and the following detailed description are exemplary and explanatory and are intended to provide further explanation of the invention as claimed.

BRIEF DESCRIPTION OF THE DRAWINGS

The accompanying drawings, which are incorporated in and constitute a part of this specification, illustrate embodiments of the invention and together with the description, serve to explain the principles of the invention.

DETAILED DESCRIPTION

Reference will now be made in detail to the present exemplary embodiments of the invention, examples of which are illustrated in the accompanying drawings. Wherever possible, the same reference numbers will be used throughout the drawings to refer to the same or like parts.

Figure 1:
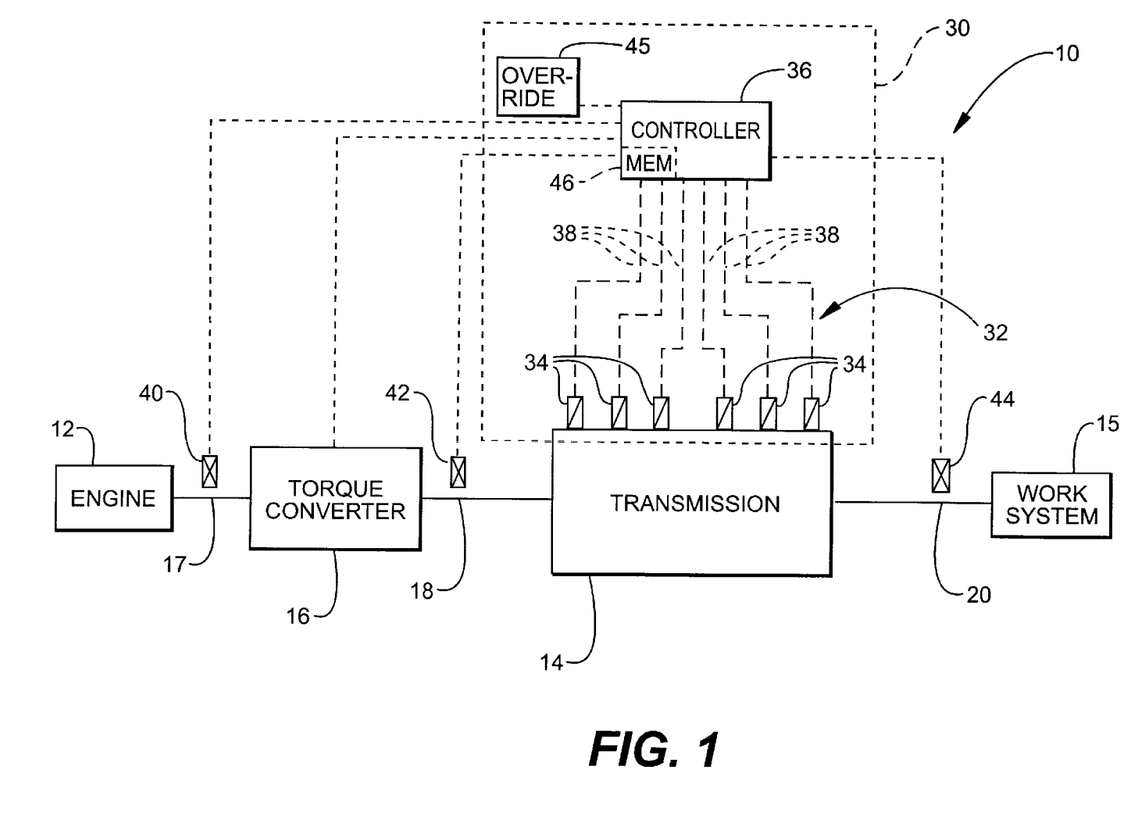
FIG. 1 is a schematic and diagrammatic illustration of a drive train in which the features and principles of the present invention may be implemented.

FIG. 1 illustrates an exemplary drive train 10 in which the features and principles of the present invention may be implemented. The drive train 10 includes an internal combustion engine 12, a multi-speed transmission 14, and a work system 15. While this exemplary embodiment utilizes an internal combustion engine, the present invention is not necessarily so limited. The work system 15 may include drive wheels (not shown), differentials (not shown), axles (not shown), or other mechanisms used to propel a work machine (not shown). Additionally, a fluidic torque converter 16 may also be provided between the engine 12 and the transmission 14. In particular, the input shaft 18 of the transmission 14 is driven by the engine 12 via an engine drive shaft 17 and the torque converter 16. The input shaft 18 drives the transmission 14, which in turn drives a transmission output shaft 20. The transmission output shaft 20 in turn drives the work system 15, which propels the work machine.

The transmission 14 includes a number of gear ratios which can be selectively engaged or disengaged from the transmission output shaft 20 during operation of the drive train 10. In particular, during an upshift from a first gear ratio to second gear ratio, the first gear ratio is disengaged from the transmission output shaft 20 and the second gear ratio is engaged to the transmission output shaft 20.

Similarly, during a downshift from the second gear ratio to the first gear ratio, the second gear ratio is disengaged from the transmission output shaft 20 and the first gear ratio is engaged to the transmission output shaft 20. It should be appreciated that the terms "first gear ratio," "second gear ratio," and "third gear ratio" apply to any adjacent gear ratios between which an upshift or downshift may be initiated and does not imply the lowest three gear ratios of the transmission 14. In one exemplary embodiment of the invention, the transmission used has 16 forward gears, 4 reverse gears, five directional clutches, and four speed clutches.

The drive train 10 may further include a control apparatus 30. The control apparatus 30 may include an actuator assembly 32 having a number of actuators 34. Each actuator 34. is operable to selectively engage or disengage one of the gear ratios of the transmission 14 with the transmission output shaft 20 in response to a control signal received via a respective signal line 38.

The control apparatus 30 further includes a controller 36 which receives operator inputs, including a desired groundspeed input, and generates shift signals which are directed to the actuators 34 via the signal lines 38. In particular, to cause the upshift from the first gear ratio to the second gear ratio, the controller 36 generates an upshift signal which causes the actuator 34 associated with the first gear ratio to disengage the first gear ratio from the transmission output shaft 20 and causes the actuator 34 associated with the second gear ratio to engage the second gear ratio to the transmission output shaft.

Similarly, to cause the downshift from the first gear ratio to the second gear ratio, the controller 36 generates a downshift signal which causes the actuator 34 associated with the second gear ratio to disengage the second gear ratio from the transmission output shaft 20 and causes the actuator 34 associated with the first ratio to engage the first gear ratio to the transmission output shaft 20.

The controller 36 may also receive various other input signals representative of the work machine system parameters, including, but not limited to, an engine speed signal from an engine speed sensor 40, a transmission input speed signal from a transmission input speed sensor 42, and a transmission output speed signal from a transmission output speed sensor 44. The sensors 40, 42, 44 may be conventional electrical transducers, such as a magnetic speed pickup type transducer, for example.

Internally, the controller 36 may include a number of conventional devices including a microprocessor (not shown), a timer (not shown) input/output devices (not shown) and a memory device 46. Stored in the memory device 46 are upshift and downshift decision curves that may be preprogrammed at the factory. The generation of these decision curves will now be illustrated.

Figure 2:
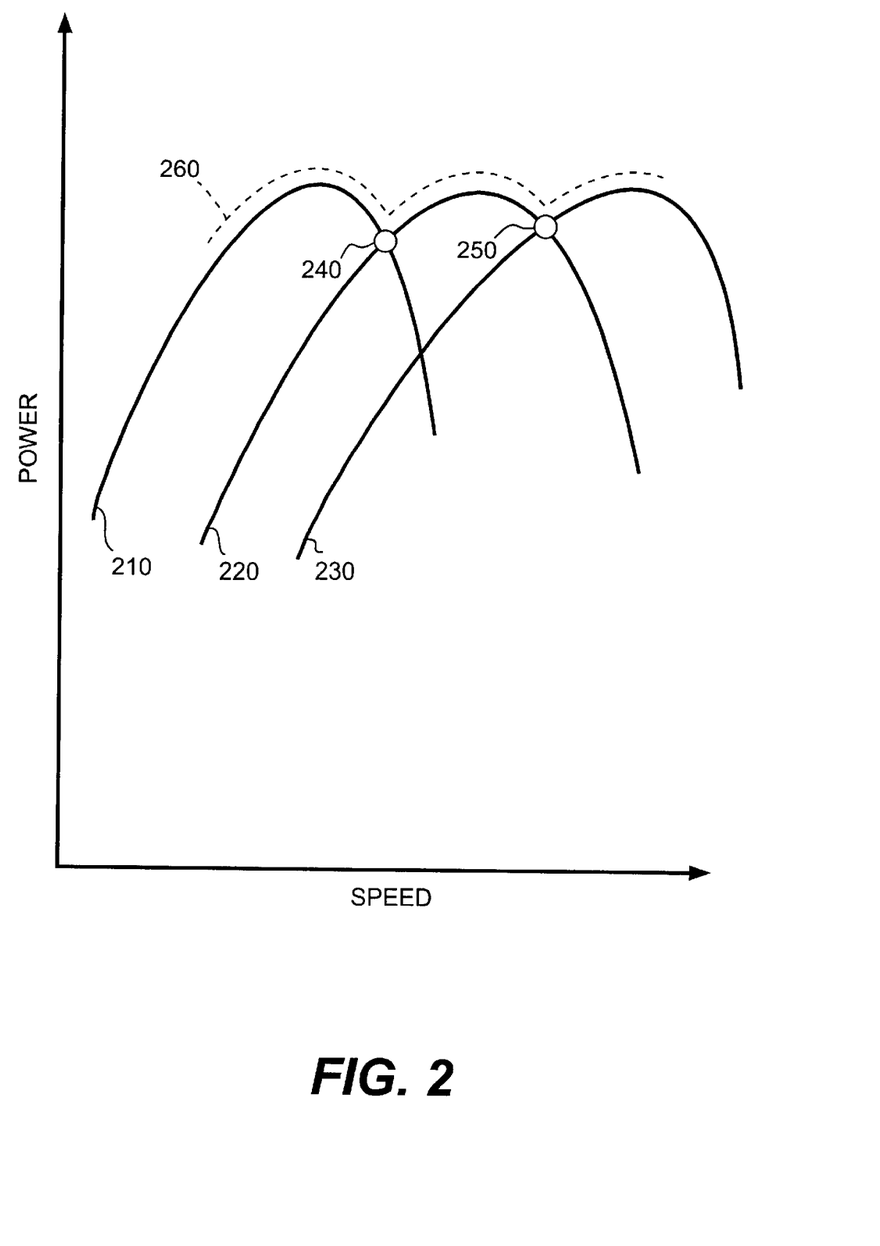
FIG. 2 illustrates a set of exemplary power curves for a first gear ratio, a second gear ratio, and a third gear ratio for which the features and principles of the present invention may be implemented.

FIG. 2 illustrates a set of exemplary power curves for a first gear ratio 210, a second gear ratio 220, and a third gear ratio 230 for which the features and principles of the present invention may be implemented. The power curves show that each gear ratio provides enhanced power over certain speed ranges. For example, the first gear ratio 210 provides enhanced power at a relatively lower range of speeds; the second gear ratio 220 provides enhanced power at a relatively intermediate range of speeds, and the third gear ratio 230 provides enhanced power at a relatively higher range of speeds. While three gear ratios are illustrated and discussed for purposes of simplifying the explanation of the present invention, it is contemplated that a lesser or greater number of gear ratios may be implemented in an embodiment of the invention. As previously discussed, one exemplary embodiment of the present invention utilizes sixteen gear ratios.

A crossover point is the intersection of two power curves and represents a point at which the power and speed of the output shaft are the same in two adjacent gear ratios. The power curves for the first gear ratio 210 and the second gear ratio 220 intersect at a crossover point 240. The power curves for the second gear ratio 220 and the third gear ratio 230 intersect at a crossover point 250. Acceleration path 260 illustrates the maximum power output path and shows the upshift/downshift points to occur at the crossover points. In the actual implementation of transmission systems, because of the difficulty of knowing the true crossover points in actual systems and because of the torque interruption and power recovery during an upshift, actual upshift and downshift points are often located in the vicinity of the true crossover points.

While using the crossover points for locating upshift and downshift locations maximizes potential power from a transmission system, such a shifting scheme is not necessarily beneficial when operating machinery in Constant Groundspeed Autoshift mode. This is because in CGA mode, the criteria is maintaining a constant groundspeed and not maximizing power; therefore, maximization of fuel conservation, or minimization of fuel burn rate, is possible. Maximum fuel efficiency does not necessarily occur by shifting at the crossover points 240 and 250.

In general, in order to maximize fuel efficiency, one should examine the brake-specific fuel consumption (BSFC) curves for an engine/transmission combination. An examination of these curves yields a decision curve which is a collection of operating points (engine power and engine speed) where the fuel economy is the same in two adjacent gear ratios. Generally, on one side of a decision curve, fuel economy is better for the lower gear ratio; on the other side of the curve, fuel economy is better for the higher gear ratio. Using these decision curves, a shifting algorithm may be implemented within the transmission system to accomplish the CGA strategy. Implementation of this CGA strategy has been shown to yield significant savings in fuel rate when compared to the strategy of operating according to a power maximizing algorithm.

Figure 3:
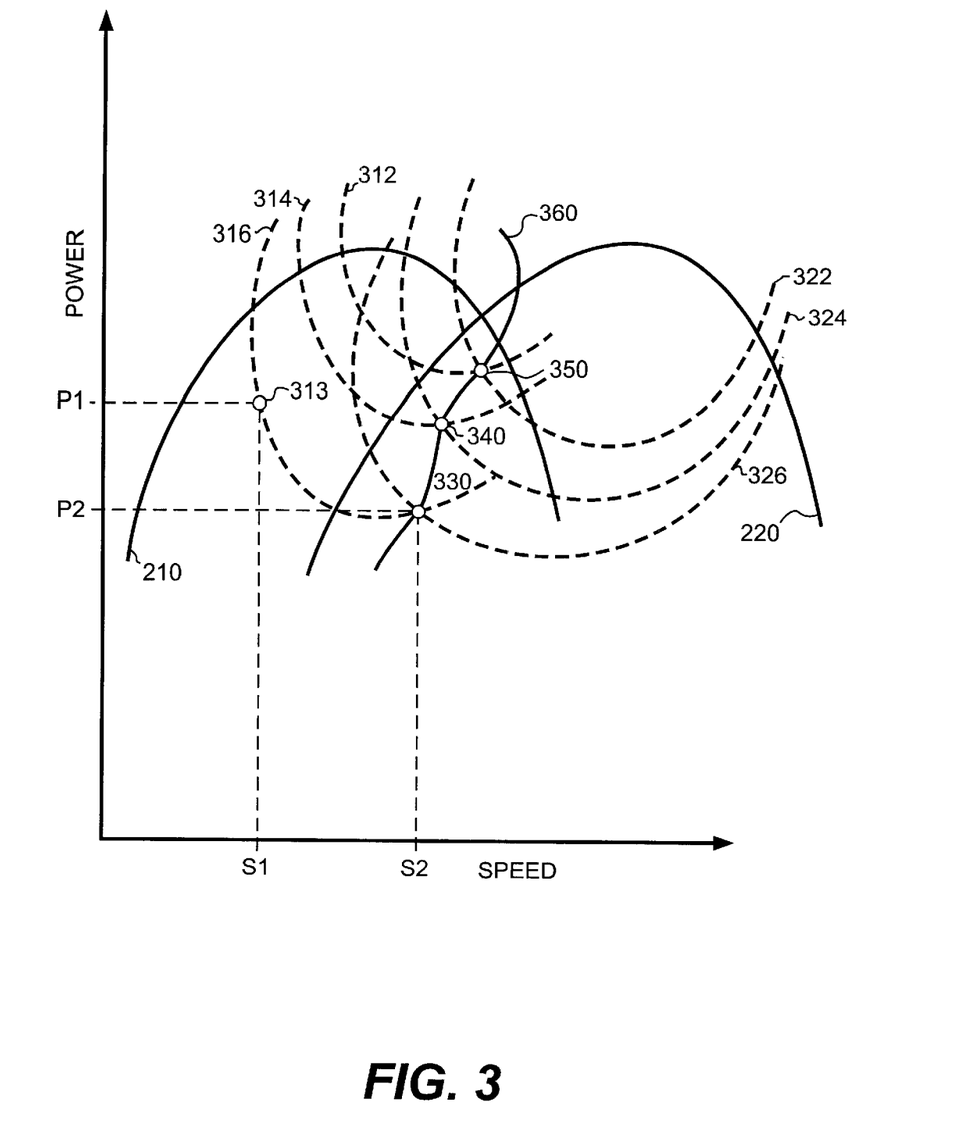
FIG. 3 illustrates a set of exemplary power curves and brakespecific fuel consumption (BSFC) curves for a first gear ratio and a second gear ratio for which the features and principles of the present invention may be implemented.

FIG. 3 illustrates a set of exemplary power curves and BSFC curves for the first gear ratio 210 and the second gear ratio 220 for which the features and principles of the present invention may be implemented. As previously discussed, the power curves show that each gear ratio provides enhanced power over certain speed ranges. For example, the first gear ratio 210 provides enhanced power at a relatively lower range of speeds, and the second gear ratio 220 provides enhanced power at a relatively higher range of speeds. While two gear ratios are illustrated and discussed for purposes of simplifying the explanation of the present invention, it is contemplated that a greater number of gear ratios may be implemented in an embodiment of the invention.

For each gear ratio, accompanying brake-specific fuel consumption curves are shown superimposed on FIG. 3. For the first gear ratio 210, three BSFC curves 312, 314 and 316 are illustrated. For the second gear ratio 220, three BSFC curves 322, 324 and 326 are similarly illustrated. These curves represent a collection of operating points (speed and power) where the fuel consumption is the same for the associated gear ratio. For example, first gear ratio 210 has associated first BSFC curve 312 which is the collection of points along which fuel consumption is the same. So, point 313 where the system is operating at power P1 and speed S1 burns the same rate of fuel as point 330 where the system is operating at power P2 and speed S2. Curve 312 illustrates points operating at a lower fuel burn rate than curve 314, which operates at a lower fuel burn rate than curve 316. Similarly, second gear ratio 220 has associated first BSFC curve 322 which is the collection of points along which fuel consumption is the same. Curve 322 illustrates points operating at a lower fuel burnrate than curve 324, which operates at a lower fuel burn rate than curve 326.

Decision curve 360 is the collection of operating points (engine power and engine speed) where the fuel economy is the same in the two adjacent gears ratios 210 and 220. The decision curve 360 is generated by examining the points of intersection of corresponding BSFC curves of the adjacent gear ratios 210 and 220. Corresponding BSFC curves are those curves for adjacent gear ratios having the same fuel consumption rate. Decision curve point 330 is determined by finding the intersection of BSFC curve 312 associated with first gear ratio 210 and BSFC curve 322 associated with second gear ratio 220. Decision curve point 340 is determined by finding the intersection of BSFC curve 314 associated with first gear ratio 210 and BSFC curve 324 associated with second gear ratio 220. Decision curve point 350 is determined by finding the intersection of BSFC curve 316 associated with first gear ratio 210 and BSFC curve 326 associated with second gear ratio 220. On one side of the decision curve 360, fuel economy is better for the lower gear ratio 210; on the other side of the curve, fuel economy is better for the higher gear ratio 220. The left side of decision curve 360 represents operating points at which fuel efficiency is better for the first gear ratio 210, and the right side of decision curve 360 represents operating points at which the fuel efficiency is better for the second gear ratio 220. While the above description illustrates how to graphically determine the decision curve 360, those skilled in the art will appreciate that such a curve could be generated by a computer, having a controller and memory, running suitable algorithms. In addition, the controller 36 (shown in FIG. 1) may be on board the vehicle and used to determine the decision curve 360.

Figure 4:
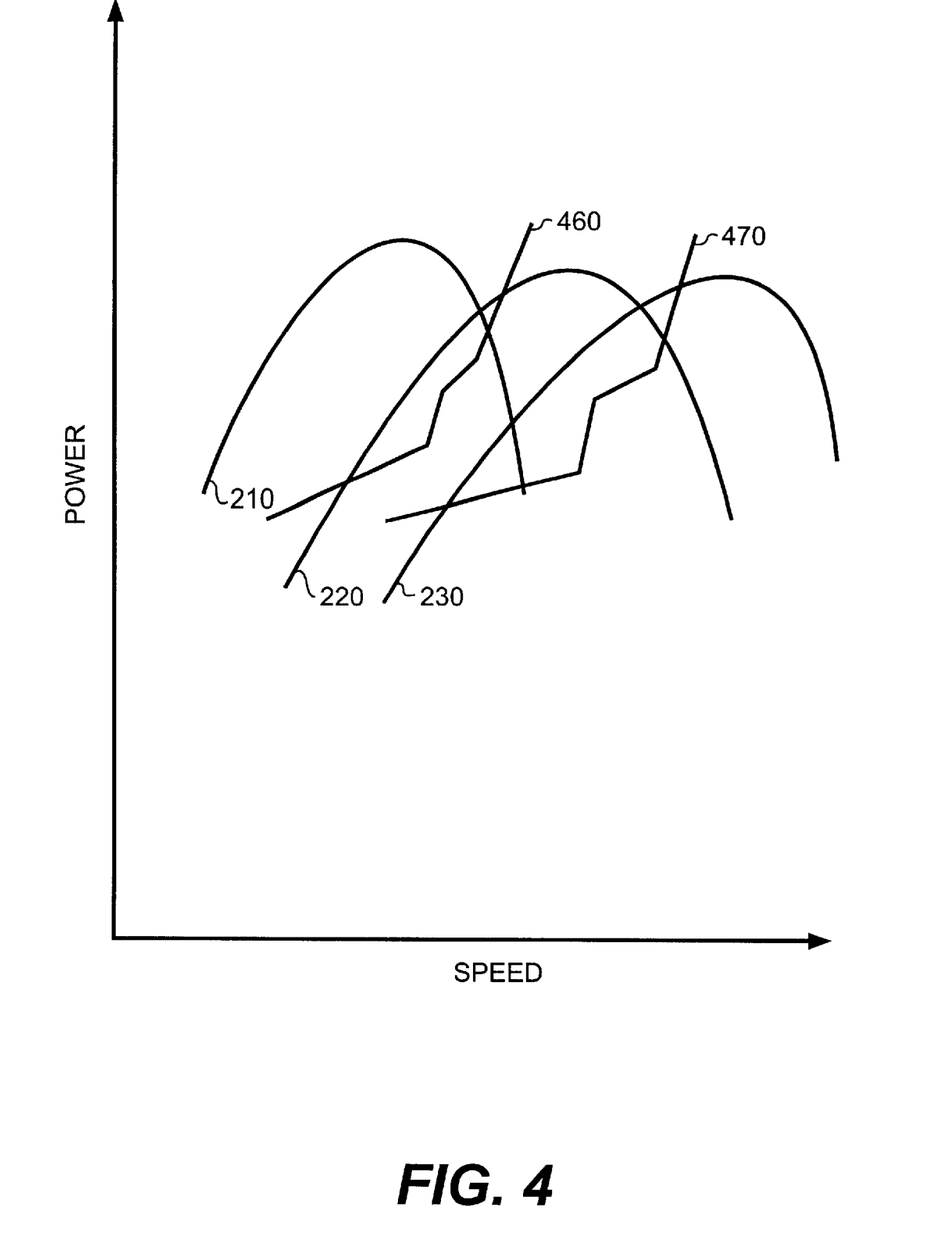
FIG. 4 illustrates a set of exemplary power curves and BSFC straight line approximation curves for the first gear ratio, the second gear ratio and the third gear ratio for which the features and principles of the present invention may be implemented.

FIG. 4 illustrates a set of exemplary power curves and BSFC curves 460 and 470, consisting of segmented straight line approximation curves, for the first gear ratio 210, the second gear ratio 220 and the third gear ratio 230 for which the features and principles of the present invention may be implemented. Performing the previously illustrated decision curve generation operation across all of the gear ratios of a transmission system yields a plurality of decision curves which may be implemented in an algorithm to determine, based on power and speed, the appropriate gear ratio selection. For a number "n" gear ratios, there may be n–1 decision curves. Implementation of the decision curves within an algorithm may be performed by, for example, straight line or polynomial interpolation of the decision curves. BSFC straight line approximation curves 460 and 470 are illustrated in FIG. 4. Approximation curve 460 is a straight line approximation of the decision curve 360 (shown in FIG. 3) that may be implemented in an algorithm to determine the shift point between first gear ratio 210 and second gear ratio 220. Approximation curve 470 is a straight line approximation of a decision curve that would be generated in a similar manner and is used to determine the shift points between second gear ratio 220 and third gear ratio 230. By using straight line approximation, memory within the system may be saved as compared with storing a more detailed description of the decision curve.

While straight line approximation decision curves 460 and 470 illustrate an approximation of what might be termed the "ideal" shifting points to achieve maximum fuel efficiency, engineering judgment suggests that simply upshifting when the operating point is below or to the right of a decision curve and downshifting when the operating point is above or to the left of a decision curve may not always achieve smooth operation of the system. Hunting, which may be defined as the undesirable cycling between two adjacent gear ratios, may result unless an acceptable range between adjacent gear ratios through hysterisis is provided.

Engineering judgment suggests that a reasonable margin should be selected to prevent hunting. While an embodiment of the invention uses a 10% margin, those skilled in the art will appreciate that other margins, or even no margins, may be possible based on the particular engineering dynamics of the application. In an exemplary embodiment of the invention, an upshift curve may be selected that is at 95% of the decision curve, and a downshift curve may be selected that is at 105% of the decision curve. This provides a 10% hysterisis and prevents hunting. Therefore, each gear ratio may have an associated upshift curve and downshift curve, except that the highest gear ratio will not have an upshift curve and the lowest gear ratio will not have a downshift curve. Once these upshift and downshift curves are generated, they are stored in memory 46 (shown in FIG. 1) for use in conjunction with a shifting algorithm.

Figure 5:
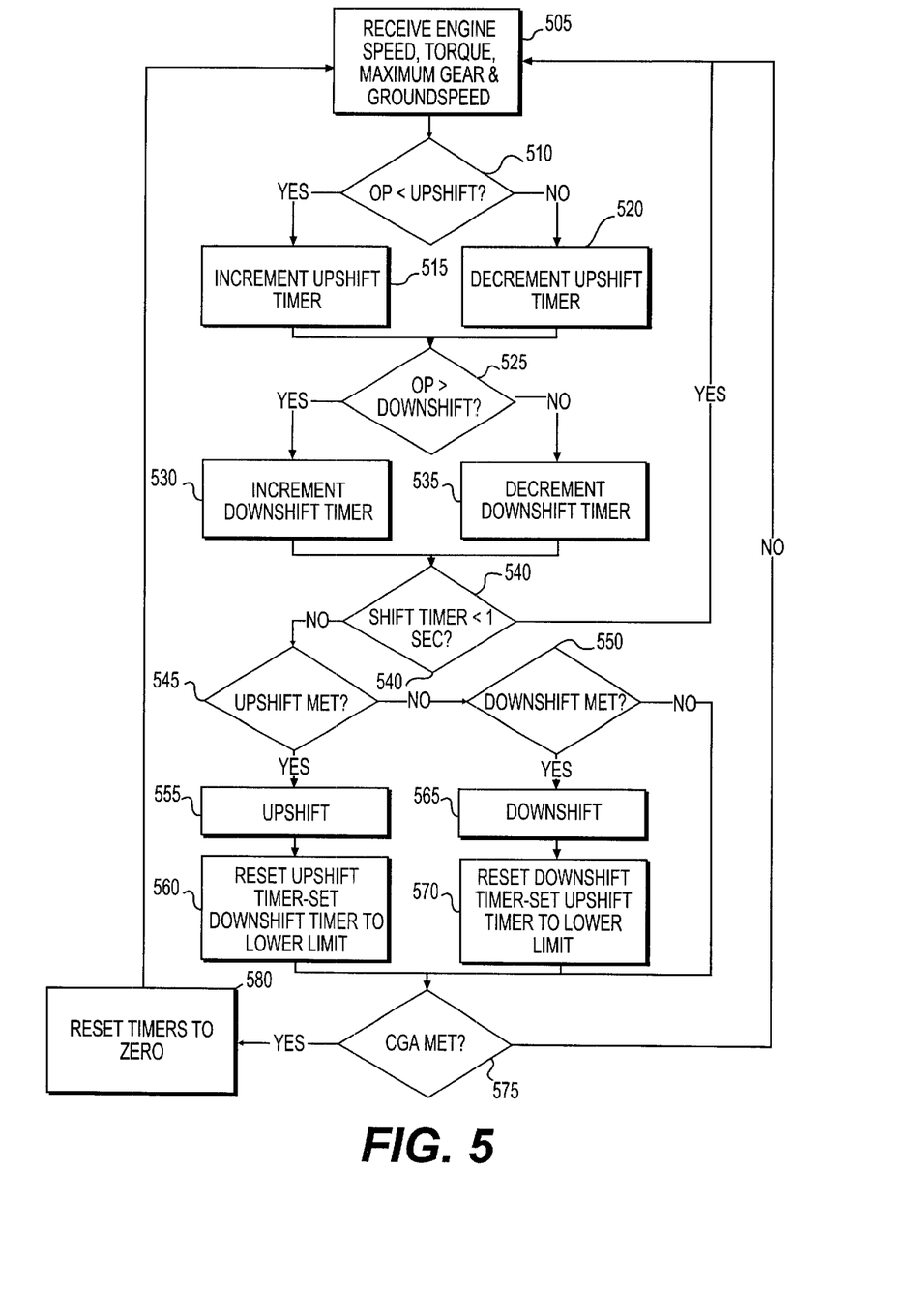
FIG. 5 is a flowchart illustrating a process for implementation of a fuel minimizing algorithm in an exemplary embodiment of the present invention.

FIG. 5 is a flowchart illustrating a process for implementation of a fuel minimizing algorithm in an exemplary embodiment of the present invention. In the exemplary embodiment, the process is implemented in controller 36 (shown in FIG. 1). At stage 505 of the algorithm, the process may receive data representing actual engine speed, actual engine torque (engine power), maximum gear ratio requested by the operator, and/or groundspeed set by the operator. At stage 510, the process determines whether the operating point (the current engine power and speed) lies below or to the right of an upshift point as determined from the upshift curve for the current gear ratio that has been stored in the memory 46. If the operating point is below or to the right of the upshift point, the process proceeds to stage 515; otherwise, the process proceeds to stage 520. At stage 515, an upshift timer is incremented, while at stage 520 the upshift timer is decremented.

Flow continues to stage 525, where the process determines whether the operating point lies above or to the left of the downshift point as determined from the downshift curve for the current gear ratio that has been stored in the memory 46. If the operating point is above or to the left of the downshift point, the process proceeds to stage 530; otherwise, the process proceeds to stage 535. At stage 530, the downshift timer is incremented, while at stage 535 the downshift timer is decremented.

At stage 540, a last shift timer is checked to see whether at least one second has elapsed since the last shift occurred. This permits time for operator intervention should the operator of the system so desire. If the last shift timer is still less than one second, processing returns to stage 505. However, if the last shift timer is greater than one second, processing proceeds to stage 545. The one second increment is exemplary and may vary depending upon the application.

At stage 545, the process assesses whether the upshift conditions have been met. An upshift can occur if:

the upshift timer exceeds 1 second; AND
the engine speed in the next higher gear ratio is greater than or equal to a minimum engine speed (1000 RPM in an exemplary embodiment); AND
the next higher gear ratio is less than or equal to the maximum gear ratio selected by the operator.

If the upshift conditions are met, flow proceeds to stage 555; if not flow proceeds to stage 550. At stage 555, the system performs an upshift to the next highest gear ratio. Then, at stage 560, the upshift timer is reset to zero and the downshift timer is set to a lower limit. The setting of a lower limit may be useful in reducing the potential for hunting. In the exemplary embodiment of the invention, the upshift timer is set to 2.5 seconds. In addition, the last shift timer is reset to zero. Flow then proceeds to stage 575.

If the upshift conditions are not met, flow proceeds to stage 550 where a determination is made as to whether the downshift conditions have been met. A downshift can occur if:

the downshift timer exceeds 1 second; OR
the current engine speed command is less than or equal to a low idle speed (900 RPM in an exemplary embodiment).

If the downshift conditions are met, flow proceeds to stage 565; if not flow proceeds to stage 575. At stage 565, the system performs a downshift to the next lower gear ratio. Then, at stage 570, the downshift timer is reset to zero and the upshift timer is set to a lower limit. Once again, the setting of a lower limit may be useful to reduce the potential for hunting. In the exemplary embodiment of the invention, the upshift timer is set to 2.5 seconds. In addition, the last shift timer is reset to zero. Flow then proceeds to stage 575.

At stage 575, the process checks whether the constant groundspeed setting has been achieved. If not, flow returns to stage 505. If so, at stage 580, all timers are reset to zero, and the flow returns to stage 505. Throughout the course of this process, an engine speed command is generated that is equal to the groundspeed command from the operator multiplied by the transmission reduction of the current gear ratio.

Industrial Applicability

Figure 6:
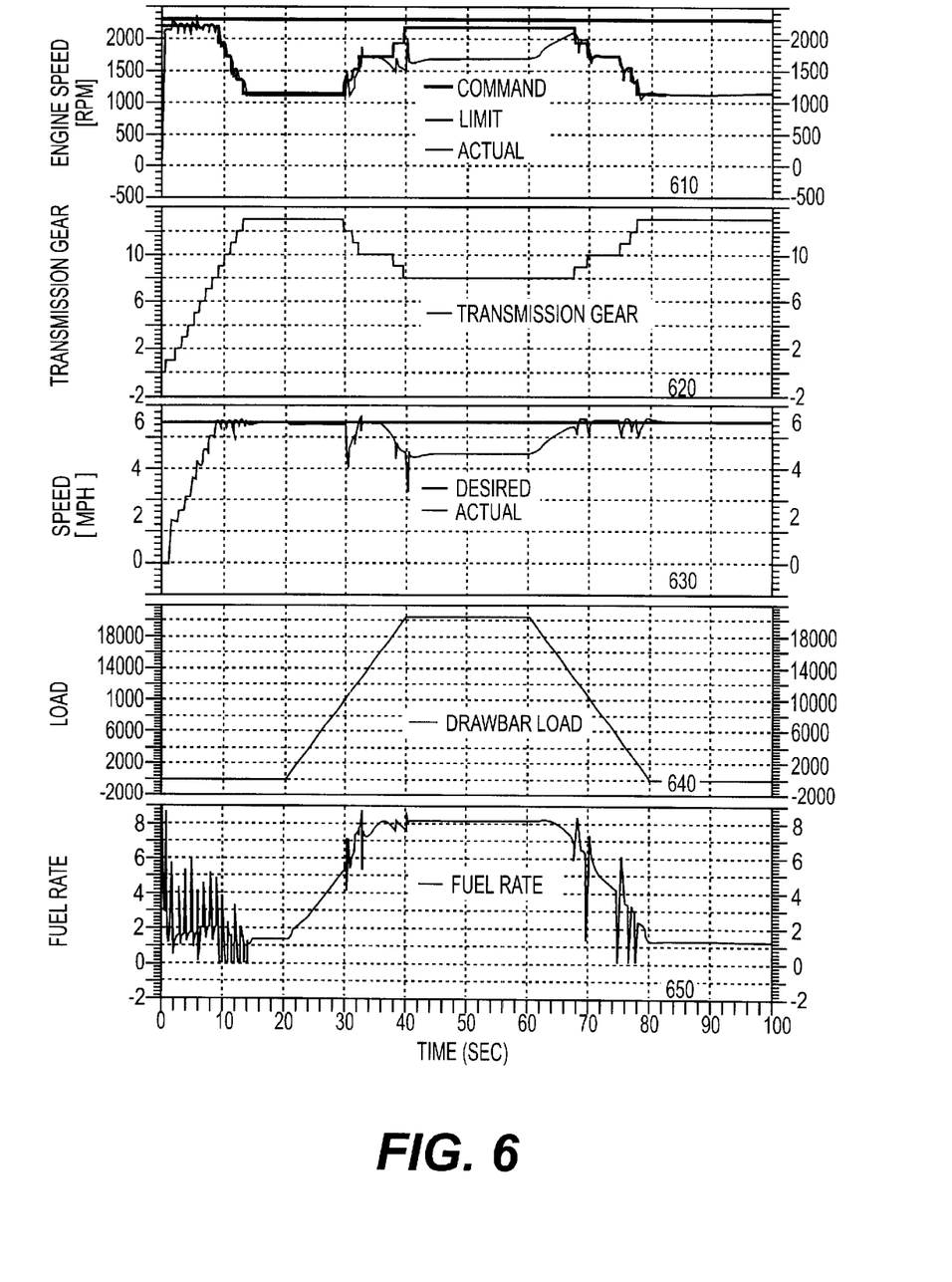
FIG. 6 is a series of graphs illustrating the results of the varying load scenario modeled on an implementation of an exemplary embodiment of the present invention.
Figure 7:
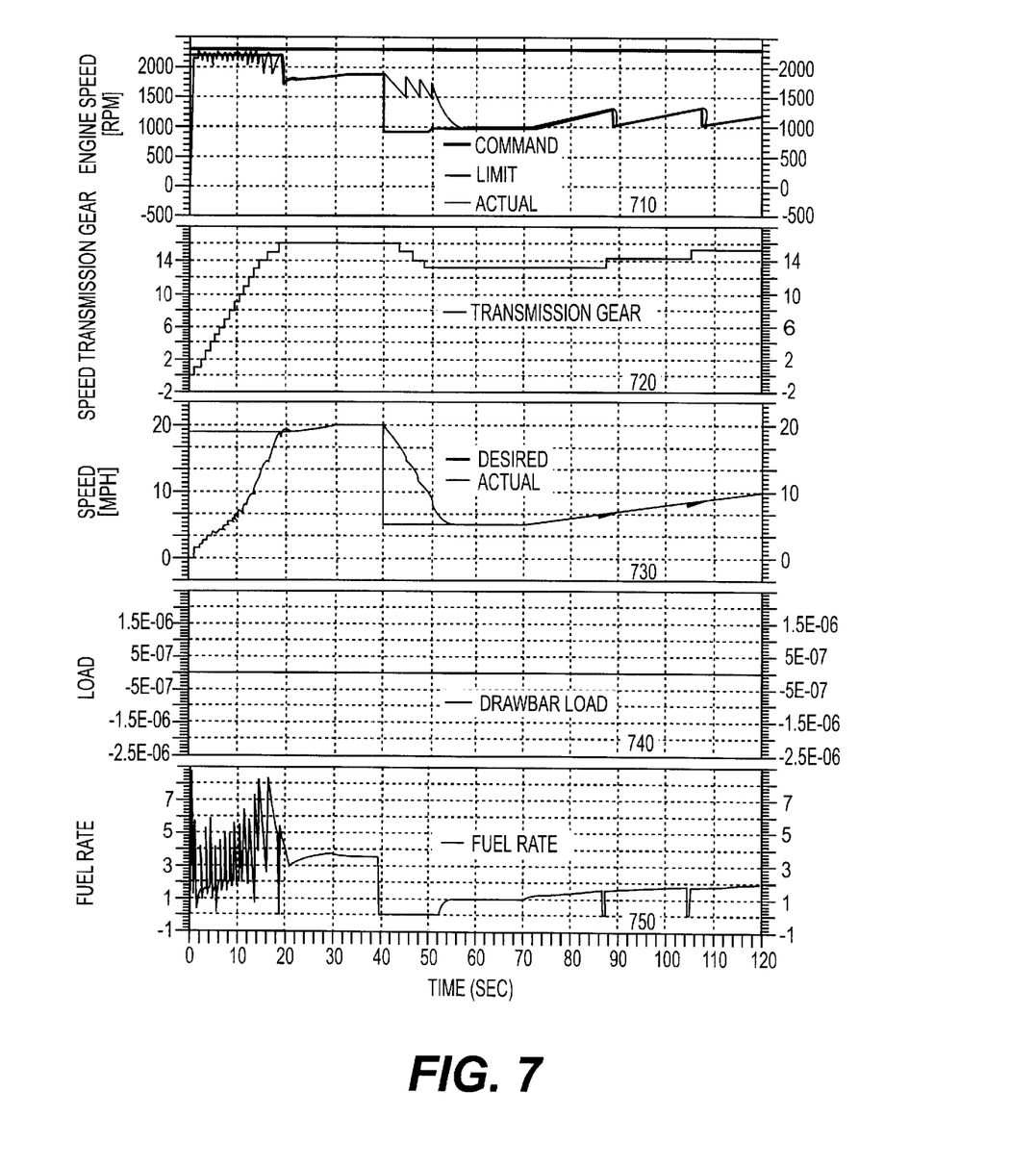
FIG. 7 is a series of graphs illustrating the results of the varying groundspeed command scenario modeled on an implementation of an exemplary embodiment of the present invention.

FIGS. 6 and 7 illustrate an exemplary embodiment of this specification. FIG. 6 illustrates the results of a varying load effected on work system 15 (FIG. 1) of an exemplary embodiment of the present invention. This may occur, for instance, when plowing a field, for example, and a tough spot is encountered in the field. FIG. 7 illustrates the performance of the algorithm during a change in groundspeed command. For instance, this may simulate what happens during operations when an operator is required to travel different travel speeds at different times.

FIG. 6 illustrates the results of the varying load scenario modeled on an implementation of an exemplary embodiment of the present invention. FIG. 6 illustrates a change in drawbar load. This may occur, for instance, when plowing and a tough spot is encountered in a field. Engine speed graph 610 illustrates the engine speed command and actual engine speed throughout the scenario; transmission gear graph 620 illustrates the transmission gear ratios throughout the scenario; speed graph 630 illustrates the speed of the machine; load graph 640 illustrates the load on the machine; and fuel rate graph 650 illustrates the fuel rate during the scenario.

Initially, as seen in load graph 640, no load is on the machine, and, as seen in transmission gear graph 620, the transmission rapidly upshifts to achieve the desired groundspeed of 6 m.p.h. at time t~13 seconds. The algorithm uses the highest gear ratio possible (13F), such that the engine speed command is greater than 1000 RPM. As the drawbar load begins to increase at time t~20 seconds, the transmission maintains the current gear ratio (13F) until the engine power is above the downshift curve. As the load increases from t~20 seconds to t~40 seconds, the higher load results in downshifts to 10F and, then again, to 8F. At this point, the engine cannot produce sufficient power to maintain groundspeed and the engine lugs back. As the load decreases from t~60 seconds to t~80 seconds, the process reverses. The algorithm determines that it is more efficient to operate at a higher gear ratio and two upshifts occur, the process stabilizes, followed by upshifts back to 13F.

FIG. 7 illustrates the results of the varying groundspeed command scenario modeled on an implementation of an exemplary embodiment of the present invention. This particularly illustrates the performance of the algorithm during a change in groundspeed command. For instance, this may simulate what happens during operations when an operator is required to travel different travel speeds at different times. Engine speed graph 710 illustrates the engine speed; transmission gear graph 720 illustrates the transmission gear ratio; speed graph 730 illustrates the speed of the machine; load graph 740 illustrates the load on the machine; and fuel rate graph 750 illustrates the rate of fuel use throughout the scenario.

Initially, the operator selects to travel at 19 m.p.h. The algorithm causes the system to upshift rapidly to gear ratio 16F. As the command increases to 20 m.p.h., or approximately 3000 RPM, the current gear ratio (16F) is maintained, while the engine speed command increases. A sudden change in command to 5 m.p.h., for instance when approaching a turn, at time t=40 seconds, results in the engine speed command dropping to low idle and the transmission executing a series of downshifts to 13F (seen in transmission gear graph 720). As the speed command slowly increases, the transmission slowly increases the gear ratios, through 14F and 15F, as it becomes advantageous to conserve fuel in accordance with the algorithm of the invention.

As discussed previously, in a constant groundspeed transmission system application, it would be useful to select the preferred gear ratio based on maximizing fuel economy, while maintaining an operator's selected groundspeed. The above described invention fulfills this need. It will be readily apparent to those skilled in this art that various changes and modifications of an obvious nature may be made, and all such changes and modifications are considered to fall within the scope of the appended claims. Other embodiments of the invention will be apparent to those skilled in the art from consideration of the specification and practice of the invention disclosed herein. It is intended that the specification and examples be considered as exemplary only, with a true scope and spirit of the invention being indicated by the following claims and their equivalents.

What is claimed is:

1. A method of determining shift points in a step gear transmission system to maximize fuel economy, comprising:
    using fuel economy data from a first gear ratio to determine a first series of constant fuel consumption curves for the first gear ratio;
    using fuel economy data from a second gear ratio to determine a second series of constant fuel consumption curves for the second gear ratio;
    determining points of intersection where a respective fuel consumption curve for the first gear ratio intersects its corresponding fuel consumption curve for the second gear ratio; and
    generating a decision curve from the points of intersection.

2. The method of claim 1, wherein the decision curve is generated as a series of straight line approximations of the points of intersection.

3. The method of claim 1, wherein the decision curve is generated as a series of polynomial approximations of the points of intersection.

4. The method of claim 1, further including generating an upshift curve based on a hysteresis value.

5. The method of claim 1, further including generating a downshift curve based on a hysteresis value.

6. A machine-readable storage medium having stored thereon machine executable instructions, the execution of said instructions adapted to implement a method of determining shift points in a step gear transmission system to maximize fuel economy, said method comprising:
    using fuel economy data from a first gear ratio to determine a first series of constant fuel consumption curves for the first gear ratio;
    using fuel economy data from a second gear ratio to determine a second series of constant fuel consumption curves for the second gear ratio;
    determining points of intersection where a respective fuel consumption curve for the first gear ratio intersects its corresponding fuel consumption curve for the second gear ratio; and
    generating a decision curve from the points of intersection.

7. The machine-readable storage medium of claim 6, wherein the decision curve is generated as a series of straight line approximations of the points of intersection.

8. The machine-readable storage medium of claim 6, wherein the decision curve is generated as a series of polynomial approximations of the points of intersection.

9. The machine-readable storage medium of claim 6, wherein the method further includes generating an upshift curve based on a hysteresis value.

10. The machine-readable storage medium of claim 6, wherein the method further includes generating a downshift curve based on a hysteresis value.

11. A system for determining shift points in a step gear transmission system to maximize fuel economy, comprising:
    a controller and memory coupled to the controller, the controller operable to:
        use fuel economy data from a first gear ratio to determine a first series of constant fuel consumption curves for the first gear ratio;
        use fuel economy data from a second gear ratio to determine a second series of constant fuel consumption curves for the second gear ratio;
        determine points of intersection where a respective fuel consumption curve for the first gear ratio intersects its corresponding fuel consumption curve for the second gear ratio; and
        generate a decision curve from the points of intersection.

12. The system of claim 11, wherein the decision curve is generated as a series of straight line approximations of the points of intersection.

13. The system of claim 11, wherein the decision curve is generated as a series of polynomial approximations of the points of intersection.

14. The system of claim 11, wherein the controller is further operable to generate an upshift curve based on a hysteresis value.

15. The system of claim 11, wherein the controller is further operable to generate a downshift curve based on a hysteresis value.

16. A method of controlling a step gear transmission to maximize fuel economy, comprising:

receiving data regarding the operating point of an engine;

comparing the operating point to a stored decision curve, wherein said decision curve divides a range of operating points between a first adjacent gear ratio and a second adjacent gear ratio based on the most fuel efficient gear ratios for operation; and shifting the transmission between the first adjacent gear ratio and the second adjacent gear ratio based on the comparison of the operating point to the decision curve.

17. The method of claim 16, wherein the decision curve further includes an upshift curve wherein the transmission is upshifted if the operating point lies below the upshift curve.

18. The method of claim 16, wherein the decision curve further includes a downshift curve wherein the transmission is downshifted if the operating point lies above the downshift curve.

19. The method of claim 16, wherein the transmission is only shifted if a predetermined period of time has elapsed since the transmission has been previously shifted.

20. The method of claim 16, wherein the transmission is shifted to provide fuel economy savings upon a change in load conditions.

21. The method of claim 16, wherein the transmission is shifted to provide fuel economy savings upon a change in groundspeed command.

22. A system for controlling a step gear transmission to maximize fuel economy, comprising:

a controller and memory coupled to the controller, the controller operable to:

receive data regarding the operating point of an engine;

compare the operating point to a stored decision curve, wherein said decision curve divides a range of operating points between a first adjacent gear ratio and a second adjacent gear ratio based on the most fuel efficient gear ratio for operation; and shift the transmission between the first adjacent gear ratio and the second adjacent gear ratio based on the comparison of the operating point to the decision curve.

23. The system of claim 22, wherein the decision curve further includes an upshift curve wherein the transmission is upshifted if the operating point lies below the upshift curve.

24. The system of claim 22, wherein the decision curve further includes a downshift curve wherein the transmission is downshifted if the operating point lies above the downshift curve.

25. The system of claim 22, wherein the transmission is only shifted if a predetermined period of time has elapsed since the transmission has been previously shifted.

26. The method of claim 22, wherein the transmission is shifted to provide fuel economy savings upon a change in load conditions.

27. The method of claim 22, wherein the transmission is shifted to provide fuel economy savings upon a change in groundspeed command.

* * * * *